US005192058A

United States Patent [19]

VanDalsem et al.

[11] Patent Number: 5,192,058

[45] Date of Patent: Mar. 9, 1993

[54] SWING CLAMP

[75] Inventors: John H. VanDalsem; Roger L. Craft, both of Emporia, Kans.

[73] Assignee: Vektek, Inc., Emporia, Kans.

[21] Appl. No.: 816,861

[22] Filed: Jan. 2, 1992

[51] Int. Cl.[5] ................ B23Q 3/08

[52] U.S. Cl. ................ 269/24; 269/32

[58] Field of Search ................ 269/20, 24, 32, 25; 254/93 H; 29/252

[56] References Cited

U.S. PATENT DOCUMENTS

| | | | |
|---|---|---|---|
| 4,174,828 | 11/1979 | Bergman | 269/20 |
| 4,620,695 | 11/1986 | Vanistendael | 269/24 |
| 4,787,130 | 11/1988 | Hale et al. | 29/252 |

*Primary Examiner*—Robert C. Watson

*Attorney, Agent, or Firm*—Hovey, Williams, Timmons & Collins

[57] ABSTRACT

A swing clamp apparatus adapted to be mounted adjacent a work surface includes a housing provided with a bore defining a longitudinal axis, and a piston received within the bore and being movable in the direction of the longitudinal axis. A clamping arm is supported on the piston for movement therewith between a clamping position and a releasing position. A first passageway is provided for delivering hydraulic fluid from a source of pressurized fluid to the first bore section of the housing to move the piston in a first direction and additional structure shifts the piston in a second direction opposite the first direction. The passageway includes a plurality of external ports formed in the housing and a manifold with which the plurality of ports communicate to permit fluid to be delivered to the first passageway, and a number of plugs are used for plugging any of the plurality of ports not used during delivery of fluid to the passageway in order to prevent leakage of fluid from the manifold.

4 Claims, 4 Drawing Sheets

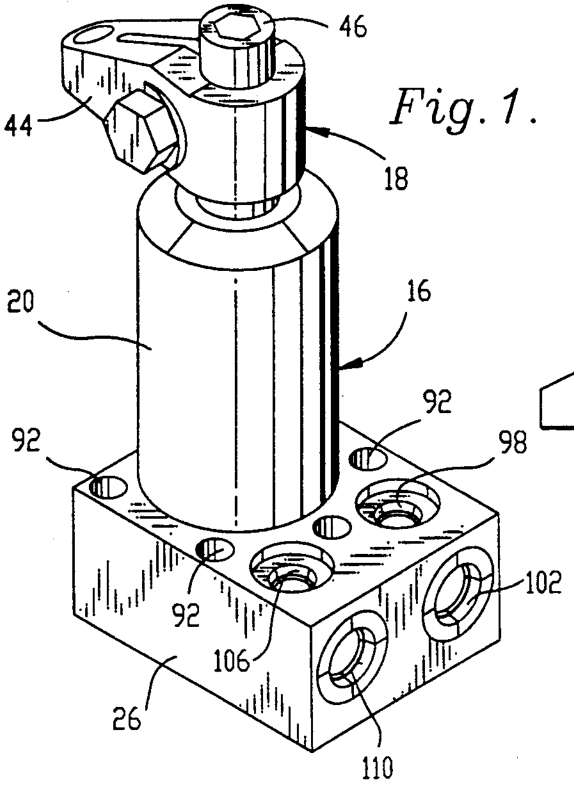
Fig. 1.
Fig. 2.
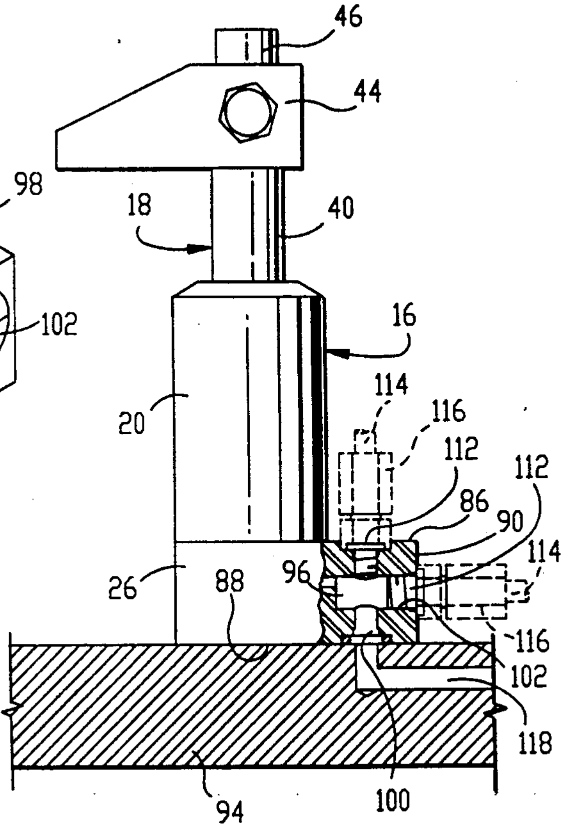
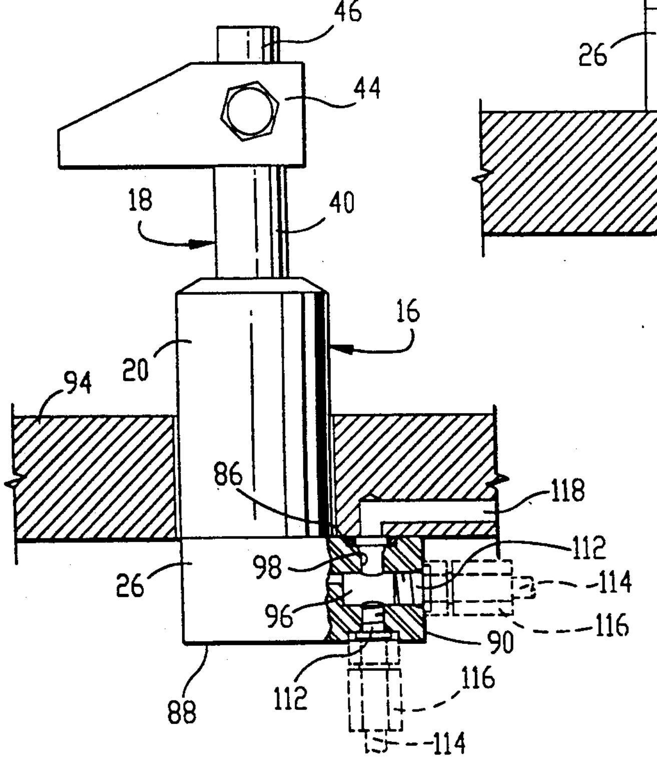
Fig. 3.

Fig. 5.
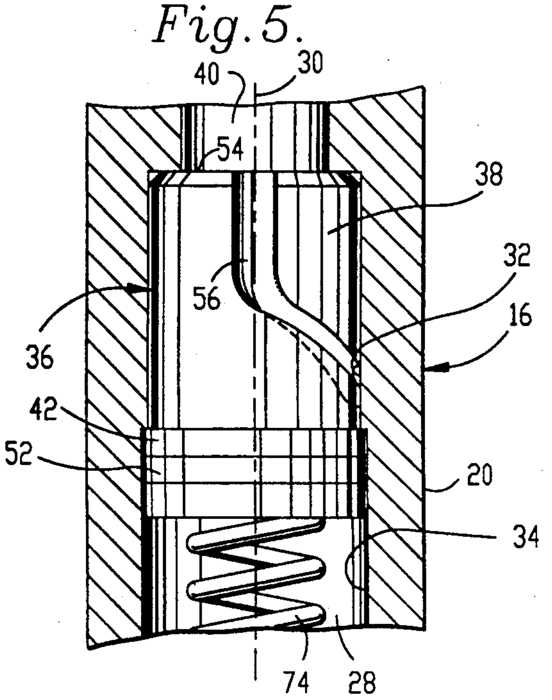
Fig. 6.
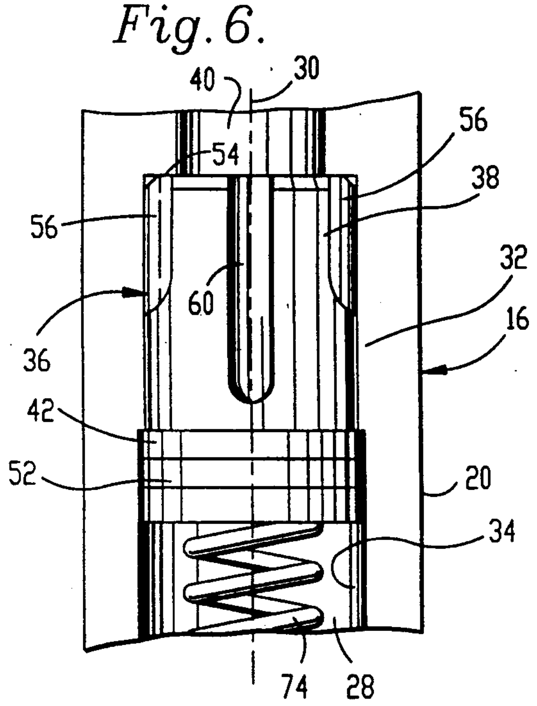
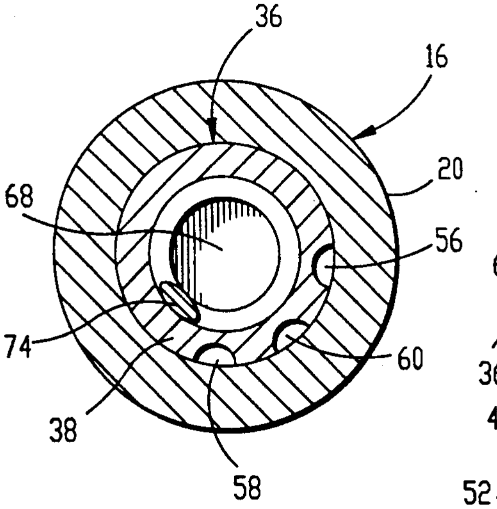
Fig. 7.
Fig. 8.
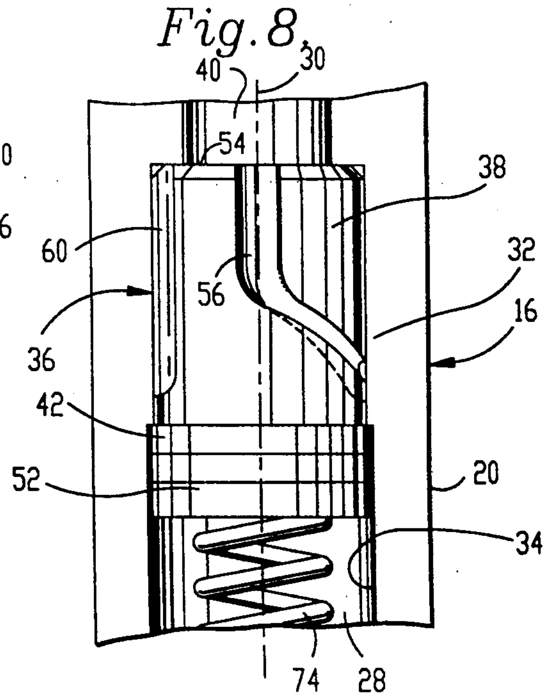

SWING CLAMP

BACKGROUND OF THE INVENTION

1. Field of the Invention

This invention relates generally to clamping devices and, more particularly, to a power actuable swing clamp apparatus for clamping a workpiece to a table of a machine tool.

2. Discussion of the Prior Art

Swing clamp assemblies are widely used in order to selectively clamp and steadily fix a workpiece to a frame or table of a machine tool prior to the actual work operation. Swing clamps are characterized by the provision of a swinging arm which not only securely clamps the workpiece to the table in a direction along a reference axis, but also swings toward or away from the workpiece about the aforementioned reference axis in order to shift the arm to a non-interfering position to facilitate removal of the workpiece at the end of the operation.

Many of the known swing clamp assemblies are provided with a housing containing a piston which is connected to the clamping arm, and the piston is shiftable within a bore of the housing under the influence of hydraulic pressure to bring the arm into clamping engagement with the workpiece. A camming mechanism, disposed either internally or externally of the housing, turns the piston or another member interconnecting the piston and the clamping arm to thereby rotate the arm as the piston is advanced or retracted. For a number of reasons, however, known swing clamp assemblies are not entirely satisfactory.

More specifically, certain of the swing clamps according to conventional constructions have a clamping arm which swings in only a single rotative direction as the arm is moved toward a position of clamping engagement with a workpiece. Obviously, these types of clamps cannot be employed in certain situations where the arm must move in an opposite direction of rotation as the clamping position is approached. It is therefore necessary in accordance with such construction to manufacture both left-swinging and right-swinging assemblies, an inconvenience which can only add to the overall costs of manufacture and inventory.

As can be seen from a review of the various known constructions for swing clamps, in order to provide a clamp construction that may be positioned on a frame or table of a machine tool and oriented to swing in a desired direction relative to a workpiece resting on the table, numerous styles of the swing clamp are required. For example, clamps assembled to swing in a first direction may be provided on a first side of the table while clamps assembled to swing in the opposite direction are secured to the opposite side of the table, and under certain circumstances the clamps are mounted above the table surface while in other applications the clamps are secured beneath the table surface and extend upward through the surface.

Although it is possible to construct a swing clamp for any particular use or for installation into a particular type of machine, it would be desirable to provide a single construction capable of being assembled in any of a plurality of different positions relative to the table of a machine tool.

OBJECTS AND SUMMARY OF THE INVENTION

It is an object of the present invention to provide a swing clamp apparatus having a construction which permits assembly in a number of different positions relative to a frame or table of a machine tool. By providing such a construction, it is a further object of the invention to reduce the number of different constructions or styles of the swing clamp required to satisfy the many various needs of machine tool users.

In accordance with these and other objects evident from the following description, a swing clamp apparatus is provided which is adapted to be mounted adjacent a work surface and operable to clamp a work article against the work surface in order for work to be carried out on the article. The apparatus comprises a housing including a bore defining a longitudinal axis and a piston received within the bore and being movable in the direction of the longitudinal axis. The piston is in sealing engagement with the housing to divide the bore into first and second bore regions. A clamping arm is supported on the piston for movement therewith between a clamping position in which the arm moves toward the work surface to permit clamping of a work article against the work surface and a releasing position in which the arm moves away from the work surface to release the work article.

A first passageway is provided for delivering hydraulic fluid from a source of pressurized hydraulic fluid to the first bore section of the housing to move the piston in a first direction between the clamping and releasing positions, and a shifting means is included for shifting the piston in a second direction opposite the first direction between the clamping and releasing positions. The passageway includes a plurality of external ports formed in the housing and a manifold with which the plurality of ports communicate to permit hydraulic fluid to be delivered to the first passageway. The apparatus also includes a plugging means for plugging any of the plurality of ports not used during delivery of hydraulic fluid to the passageway in order to prevent leakage of fluid from the manifold.

By constructing a swing clamp apparatus in accordance with the present invention, numerous advantages are realized. For example, by providing a manifold in the apparatus and a plurality of ports extending from the manifold, it is possible to orient the apparatus in any desired position relative to the frame or table of a machine tool while presenting at least one of the ports at a convenient location for connection to a line extending to a source of pressurized hydraulic fluid.

In accordance with another aspect of the invention, a flange extends outward from the housing and includes a plurality of contiguous surfaces, two of which are parallel to one another and define mounting surfaces on which the apparatus may be supported relative to the work surface. External ports are formed in each of the two parallel surfaces and in at least one additional contiguous surface of the flange in order to allow the apparatus to be supported by either of the parallel surfaces while presenting at least two possible points of attachment for the line extending to the source of hydraulic fluid.

BRIEF DESCRIPTION OF THE DRAWING FIGURES

A preferred embodiment of the present invention is described in detail below with reference to the attached drawing figures, wherein:

FIG. 1 is a perspective view of a swing clamp apparatus constructed in accordance with the preferred embodiment;

FIG. 2 is a side elevational view of the swing clamp, illustrating a first mounting arrangement thereof;

FIG. 3 is a side elevational view of the swing clamp, illustrating a second mounting arrangement thereof;

FIG. 5 is a fragmentary sectional view of the swing clamp, illustrating a first portion of the external surface of a piston of the apparatus;

FIG. 6 is a fragmentary sectional view of the swing clamp, illustrating a second portion of the external surface of the piston;

FIG. 7 is a sectional view taken along line 7—7 of FIG. 6;

FIG. 8 is a fragmemtary sectional view of the swing clamp, illustrating a third portion of the external surface of a piston;

DETAILED DESCRIPTION OF A PREFERRED EMBODIMENT

A swing clamp apparatus constructed in accordance with a preferred embodiment of my present invention is illustrated in FIG. 1, and includes a housing 16 and a piston assembly 18.

Figure 4:
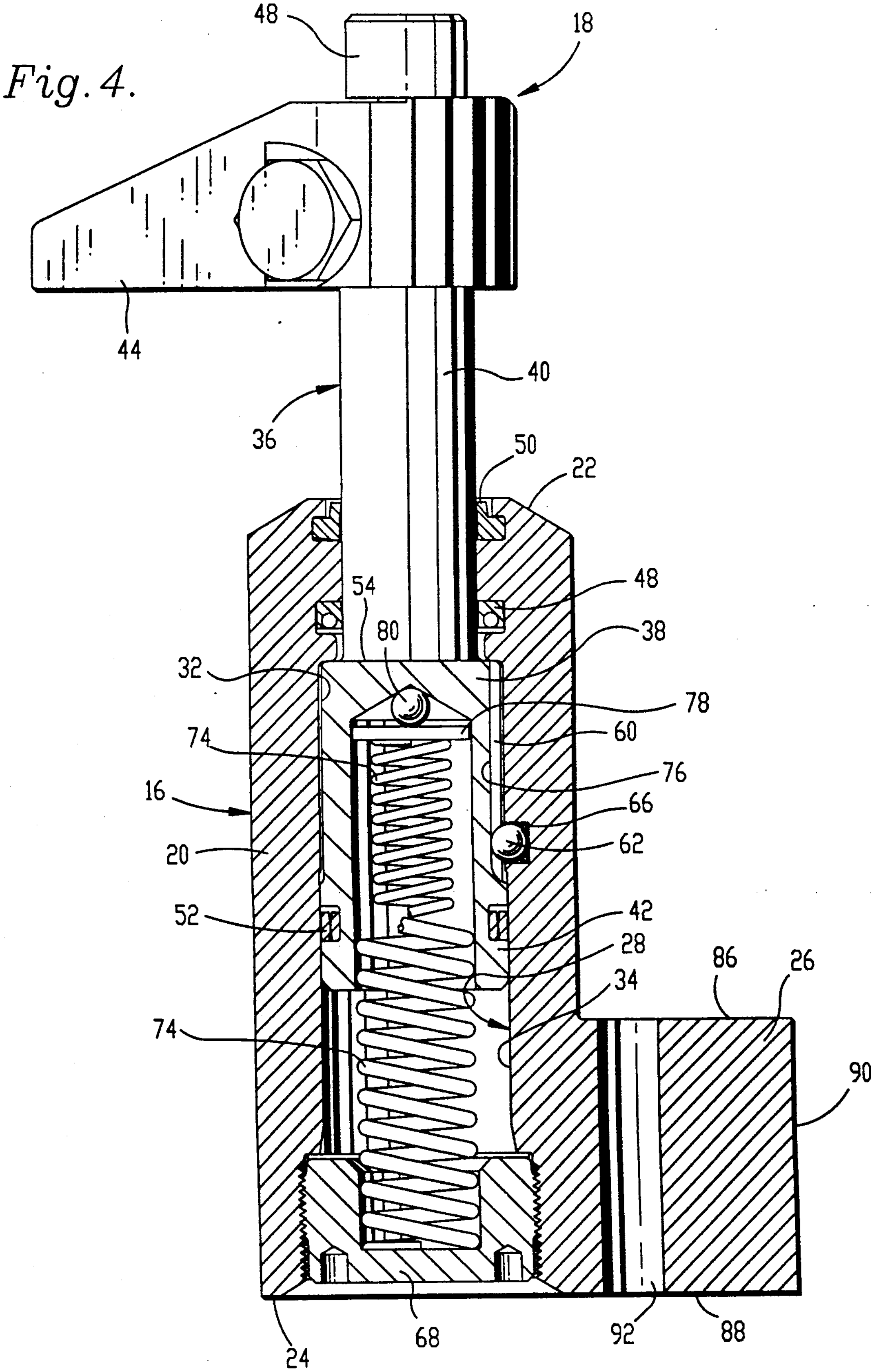
FIG. 4 is a side elevational view, partially in section, of the swing clamp.

The housing includes a cylindrical portion 20 having a first end 22 and a second end 24 remote from first end, as shown in FIG. 4, and a flange 26 extending outward from the second end of the cylindrical portion in a direction perpendicular to the length thereof.

The ends 22, 24 of the housing 16 present first and second openings defining a generally cylindrical bore 28 extending through the cylindrical portion of the housing. A reference axis 30 is defined by the bore, as illustrated in FIG. 5. An upper, small diameter region 32 of the bore is joined by a lower, larger diameter region 34.

Returning to FIG. 4, the piston assembly includes a piston 36 received in bore 28 and shiftable in either direction along the axis 30. The piston 36 includes an intermediate cylindrical section 38 as well as an elongated upper section 40 which is of a diameter smaller than the intermediate section and which extends outwardly from bore 28 past the first end of the cylindrical section away from the housing along axis 30. A lower, large diameter section 42 of the piston adjoins the intermediate section opposite the upper cylindrical section.

A clamping arm 44 is connected to the small diameter section 40 of piston 36 and extends in a radial direction away from the reference axis 30. A bolt or the like 46 extends through a hole in the clamping arm and is received in a threaded opening formed at the end of piston section 40, and securely fixes the arm 44 to the piston.

The first end 22 of the housing 16 is provided with two annular grooves adjoining the bore 28, one of which carries a seal 48 and the other of which carries a wiper 50.

The lower section 42 of the piston 36 is integrally formed with the intermediate section 38 and is of a diameter sized for complemental, sliding reception in the lower, large diameter region 34 of the bore 28. An annular groove circumscribes the lower section 42 of the piston and carries a seal 52.

As shown in FIGS. 5–8, the piston 36 presents a cam passage or shoulder 54 which is located between the top of the intermediate section 38 and the lower end of the smaller diameter, upper piston section 40. An outermost area of shoulder 54 immediately adjacent the external surface of the intermediate section 38 is formed with a chamfered surface.

Referring to FIG. 5, the external surface of intermediate section 38 is constructed to present a left curved cam slot 56 which extends from the shoulder 54 in a vertical direction parallel to reference axis 30 before turning and extending around a portion of the circumference of the intermediate section 38 while continuing a vertical descent.

In addition, a right curved cam slot 58, as illustrated in FIG. 8, is spaced from the left curved cam slot 56, shown in FIG. 5, and also presents a vertical section which begins at the shoulder 54 and extends downwardly until reaching another section which curves around the circumference of the intermediate section 38 while continuing to extend somewhat in a downwardly direction. Although not shown, the oppositely curved cam slots 56, 58 may each be provided with a relatively short vertical section at their respective lowermost ends. A straight cam slot 60, as shown in FIG. 6, is provided in the intermediate section between the curved slots 56, 58 and extends vertically along the intermediate section 38 in a direction parallel to the longitudinal axis 30. This slot provides for straight, non-rotating clamping action. The relative positions of the three cam slots 56, 58, 60 is shown in FIG. 7.

A cam follower in the nature of a ball 62 is shown in detail in FIG. 4, and is carried by the housing 16 within bore 28. The ball 62 is received in a cylindrical cavity 64 which communicates with bore 28 and which presents a flat bottom. A single resilient, synthetic rubber O-ring 66 intermediate the flat bottom and ball 62 urges the latter in a direction toward the piston 36.

A cap 68 normally covers the opening presented by the second end 24 of housing 16. A cylindrical periphery of cap 68 is threaded for mating reception with threads formed in the second end 24 of housing 16. The threaded connection permits selective movement of the cap 68 in a direction along the reference axis 30 and permits access to the bore of the housing.

Figures 9, 10, 11, 12, 13, 14:
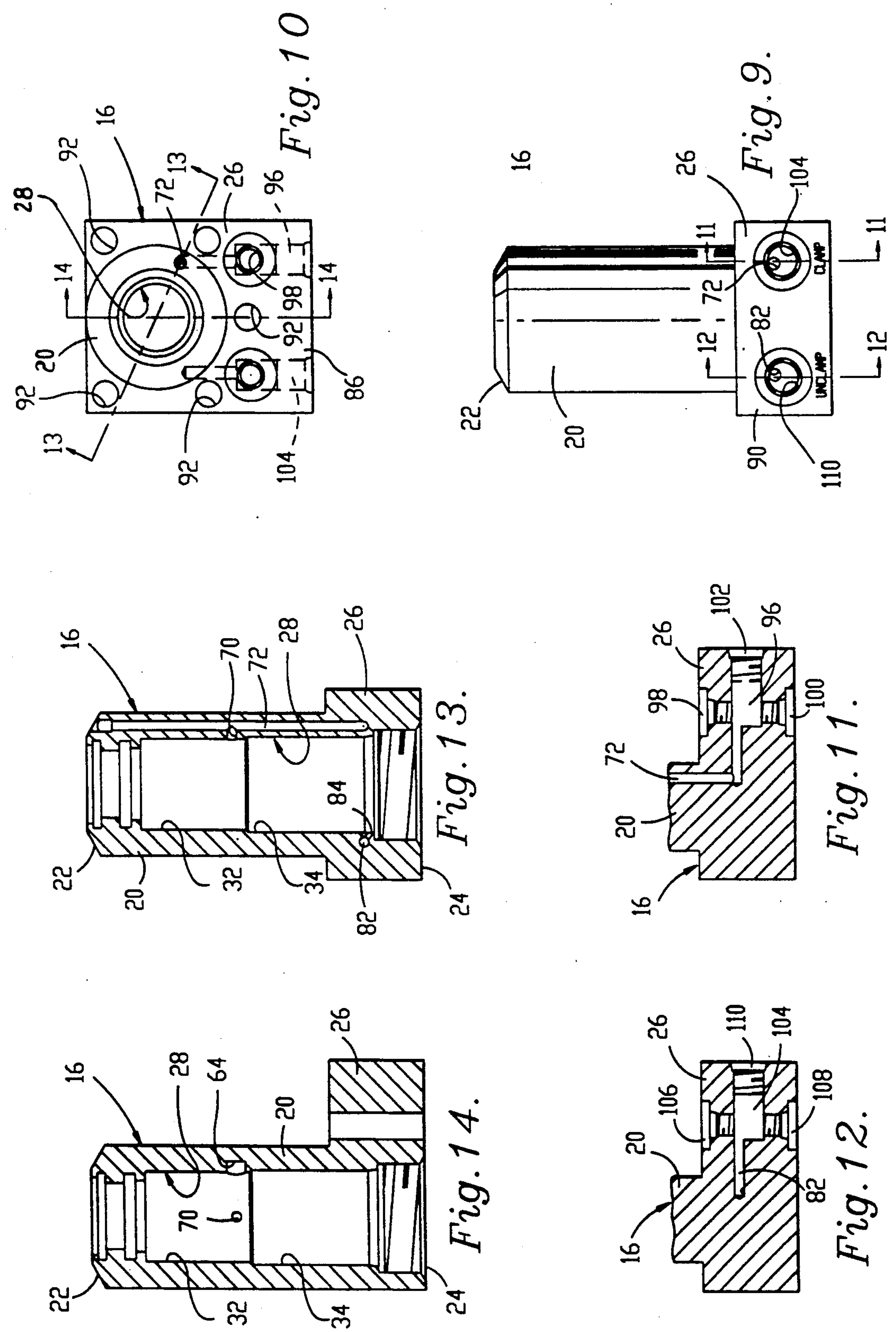
FIG. 9 is a rear elevational view of a housing of the apparatus.
FIG. 10 is a top plan view of the housing.
FIG. 11 is a sectional view taken along line 11—11 of FIG. 9.
FIG. 12 is a sectional view taken along line 12—12 of FIG. 9.
FIG. 13 is a sectional view taken along line 13—13 of FIG. 10.
FIG. 14 is a sectional view taken along line 14—14 of FIG. 10.

A port 70, as shown in FIG. 13, is formed in the housing 16 for admitting hydraulic fluid through a small passageway 72 and into the small diameter section 32 of the bore 28. Application of hydraulic fluid under pressure through port 70 is directed into the small annular space defined between the housing and the piston which are located between seals 48, 52, as shown in FIG. 4, for effecting downward shifting movement of the piston 36 toward the cap 68 along axis 30.

A compression spring 74 as illustrated in the embodiment of FIGS. 5–8, or a pair of compression springs as shown in FIG. 4, extend along the axis 30 in bore 28 and include lower ends that are received in a recess of cap 68. An upper end of the spring or springs 74 extends within a cylindrical cavity 76 centrally formed within the piston 36. The spring or springs 74 bias piston 36 upwardly so that once the pressure of hydraulic fluid admitted through port 70 is below a predetermined value the spring or springs urge the piston upward away from the cap. The upper ends of springs 74 contact a disc 78 which in turn engages a ball 80 in engagement with the piston at the upper end of the cavity 76 in order to permit free rotational movement of the piston 36 about axis 30 as the spring or springs 74 are compressed or extended.

As shown in FIG. 13, a second hydraulic fluid passageway 82 may be formed in the housing for admitting pressurized hydraulic fluid through a port 84 into the lower, large diameter region 34 of bore 28 to facilitate upward, return movement of the piston 36 once the application of fluid pressure to port 70 is interrupted. If desired, springs may be eliminated from the apparatus if the introduction of fluid pressure through second passageway 82 and into port 84 is to be used instead of the springs for returning piston 36 to its uppermost position.

Returning to FIG. 1, the flange 26 is shown as including spaced, parallel upper and lower planer surfaces 86, 88 separated from one another by one or more contiguous sidewalls 90. A plurality of holes 92 extend between and through the upper and lower surfaces to define means for permitting the housing to be attached to the frame or table of a machine tool or the like in any of at least two different positions.

For example, as shown in FIG. 2, the apparatus may be mounted on the top surface of a frame or table 94 with the lower surface 88 of the flange 26 in engagement with the top surface of the table, or on the bottom surface of the frame or table 94 with the upper surface 86 of the flange in contact with the bottom surface of the frame or table.

A first manifold 96 is provided within the flange 26 and is connected to the passageway 72 leading to port 70. A first set of external ports 98, 100, 102 extend between the manifold and the region exterior of the housing. Each of these three external ports are provided in different surfaces of the flange, with a port 98, 100 being provided in each of the upper and lower surfaces 86, 88 of the flange, and with the third port 102 extending through one of the contiguous sidewalls 90. This arrangement is also illustrated in FIG. 11.

A second manifold 104 similar to the first manifold 96 is shown in FIG. 12, and is provided in the flange in association with the passageway 82 connected with port 84. This second manifold 104 is also provided with a set of external ports 106, 108, 110 extending between the manifold and the region exterior the housing. The ports 106, 108, 110 are paired with the ports 98, 100, 102 in each of the flange surfaces so that at least one port of each set of ports is accessible regardless of the orientation of the apparatus when mounted on a machine tool.

As shown in FIGS. 2 and 3, a number of plugs 112 are provided in association with the apparatus which are formed for threaded receipt within the external ports in order to seal the ports when not in use.

After construction of the swing clamp apparatus and once the desired mounting arrangement is determined, the position of the piston 36 within the bore 28 of the housing is adjusted to position one of the cam slots 56, 58, 60 in engagement with the ball 62. For example, if it is desired for the clamping arm 44 to swing in a first rotary direction when moving between the clamping and releasing positions, the cam slot 56 shown in FIG. 5 is aligned with the ball.

Alternately, if it is desired to swing the clamping arm 44 in the opposite rotary direction during clamping and releasing operations, the cam slot 58 shown in FIG. 8 is aligned with the ball 62. Finally, if vertical movement only is required, the cam slot 60 shown in FIG. 6 is aligned with the ball.

With reference to FIG. 4, this adjustment of the piston is carried out by loosening the cap 68 and pressing the piston 36 toward the cap against the biasing force of the springs 74 until the shoulder 54 passes beyond the ball 62. Thereafter, the piston may be rotated until the desired slot is in alignment with the ball, at which point the piston is released and the spring urges the piston away from the cap. Upon tightening of the cap 68, the piston 36 is retained in the desired orientation relative to the ball.

After the swinging motion of the piston 36 has been set, and the desired external port or ports 98, 100, 102, 106, 108, 110 to be connected to the source of pressurized hydraulic fluid have been chosen, the remaining ports are plugged. Thereafter the apparatus is fastened to the frame or table 94 of the machine tool by arranging the apparatus in one of the positions shown in FIGS. 2 and 3, and passing threaded fasteners or the like through the holes 92 in the flange 26 and into corresponding holes in the frame or table. Once the apparatus is securely fixed relative to the frame or table, a line 114 extending from any conventional source of pressurized hydraulic fluid is connected to the available port or ports by a threaded coupling 116 such as that shown in dashed lines in the FIGS. 2 and 3.

Turning to FIG. 2, a mounting arrangement of the apparatus is shown wherein the apparatus is attached to an upper surface of the frame or table 94 of a machine tool. When constructed in this manner, three possible means are available for connecting the manifold or manifolds 96, 104 to the source of hydraulic fluid. The first means includes connecting lines 114 to the external ports 98, 106 extending through the upper surface 86 of the flange 26, while the second means includes connecting the lines to the ports 102, 110 provided in the sidewall 90. The final means includes connecting the lines to feeder holes 118 formed in the frame or table 94 and connected with the ports 100, 108 provided in the lower surface 88 of the flange. When these feeder holes are used, seals are provided to seal the connection between the holes and the ports.

Similar options are available for connecting the manifold or manifolds 96, 104 to the source of hydraulic fluid when the apparatus is mounted in the manner shown in FIG. 3.

Although the invention has been described with reference to the embodiment illustrated in the attached drawing figures, it is understood that substitutions may be made and equivalents employed herein without departing from the scope of the invention as recited in the claims. For example, although the preferred embodiment includes hydraulic powering means for actuating the swing clamp, pneumatic pressure maybe used, as can any other conventional pressurizing medium.

What is claimed is:

1. A swing clamp apparatus adapted to be mounted adjacent a work surface and operable to clamp a work article against the work surface in order for work to be carried out on the article, the apparatus comprising:

a housing including a bore defining a longitudinal axis, a mounting flange extending outward from the housing in a direction perpendicular to the longitudinal axis, and means for permitting the apparatus to be mounted relative to the work surface in any one of the plurality of different positions;

a piston received within the bore and being movable in the direction of the longitudinal axis, the piston being in sealing engagement with the housing to divide the bore into first and second bore regions;

a clamping arm supported on the piston for movement therewith between a clamping position in which the arm moves towards the work surface to permit clamping of work article against the work surface and a releasing position in which the arm moves away from the work surface to release the work article;

a first passageway for delivering pressurizing fluid from a source of pressurized fluid to the first bore section of the housing to move the piston in a first direction between the clamping and releasing positions;

shifting means for shifting the piston in a second direction opposite the first direction between the clamping and releasing position;

the passageway including a first plurality of external ports formed in the flange and a first manifold with which the first plurality of ports communicate to permit pressurizing fluid to be delivered to the first passageway; and plugging means for plugging any of the plurality of ports not used during delivery of pressurizing fluid to the passage, wherein the flange includes a plurality of contiguous surfaces, each of the first external ports being formed in a different one of the contiguous surfaces.

2. A swing clamp apparatus adapted to be mounted adjacent a work surface and operable to clamp a work article against the work surface in order for work to be carried out on the article, the apparatus comprising:

a housing including a bore defining a longitudinal axis, a mounting flange extending outward from the housing in a direction perpendicular to the longitudinal axis, and means for permitting the apparatus to be mounted relative to the work surface in any one of the plurality of different positions;

a piston received within the bore and being movable in the direction of the longitudinal axis, the piston being in sealing engagement with the housing to divide the bore into first and second bore regions;

a clamping arm supported on the piston for movement therewith between a clamping position in which the arm moves toward the work surface to permit clamping of a work article against the work surface and a releasing position in which the arm moves away from the work surface to release the work article;

a first passageway for delivering pressurizing fluid from a source of pressurized fluid to the first bore section of the housing to move the piston in a first direction between the clamping and releasing positions;

shifting means for shifting the piston in a second direction opposite the first direction between the clamping and releasing position;

the passageway including a first plurality of external ports formed in the flange and a first manifold with which the first plurality of ports communicate to permit pressurizing fluid to be delivered to the first passageway; and plugging means for plugging any of the plurality of ports not used during delivery of pressurizing fluid to the passageway in order to prevent leakage of fluid from the manifold;

the shifting means including a second passageway for delivery pressurizing fluid from the source of pressurized fluid to the second bore section of the housing to move the piston in the second direction between the clamping and releasing positions, the second passageway including a second plurality of external ports formed in the flange and a second manifold with which the second plurality of ports communicate to permit fluid to be delivered to the second passageway, wherein the flange includes a plurality of contiguous surfaces, and one of the first external ports and one of the second external ports are formed in at least two of the contiguous surfaces.

3. A swing clamp apparatus as recited in claim 1, wherein two of the surfaces of the flange are parallel to one another and define mounting surfaces on which the apparatus may be supported relative to the work surface, and external ports are formed in each of the two parallel surfaces and in at least one additional contiguous surface of the flange.

4. A swing clamp apparatus as recited in claim 3, wherein the means for permitting the apparatus to be mounted relative to the work surface in any one of a plurality of different positions includes a plurality of holes passing between the two opposed surfaces of the flange.

* * * * *